(12) United States Patent
Moore et al.

(10) Patent No.: US 7,406,447 B2
(45) Date of Patent: Jul. 29, 2008

(54) OPENING PRICE PROCESS FOR TRADING SYSTEM

(75) Inventors: Daniel F. Moore, New Haven, CT (US); Yek Eng, New Providence, NJ (US); Mark DeNat, Bedford, NY (US); Michael Galus, Southbury, CT (US); Richard Justice, Lyme, NH (US); Bruce E. Friedman, Monroe, CT (US); Timothy Vincent, Shelton, CT (US); John Hughes, Stratford, CT (US); Peter Martyn, Ridgewood, NJ (US)

(73) Assignee: The NASDAQ OMX Group, Inc., Rockville, MD (US)

( * ) Notice: Subject to any disclaimer, the term of this patent is extended or adjusted under 35 U.S.C. 154(b) by 981 days.

(21) Appl. No.: 10/046,652

(22) Filed: Jan. 14, 2002

(65) Prior Publication Data

US 2003/0135443 A1    Jul. 17, 2003

(51) Int. Cl.
*G06Q 40/00* (2006.01)
*H04K 1/00* (2006.01)
*H04L 9/00* (2006.01)

(52) U.S. Cl. .............................. 705/75; 705/9; 705/35; 705/36 R; 705/37

(58) Field of Classification Search ................... 705/35, 705/36, 37, 36 R, 9
See application file for complete search history.

(56) References Cited

U.S. PATENT DOCUMENTS

| 6,016,483 | A * | 1/2000 | Rickard et al. | 705/36 R |
| 2002/0019795 | A1 * | 2/2002 | Madoff et al. | 705/37 |
| 2002/0156719 | A1 * | 10/2002 | Finebaum et al. | 705/37 |
| 2003/0229563 | A1 * | 12/2003 | Moore et al. | 705/37 |

* cited by examiner

*Primary Examiner*—Andrew J. Fischer
*Assistant Examiner*—Cristina Owen Sherr
(74) *Attorney, Agent, or Firm*—Fish & Richardson P.C.

(57) ABSTRACT

A system for determining an opening price for products traded over a distributed, networked computer system, includes a plurality of workstations for entering orders for financial products into the distributed, networked computer system and a server computer coupled to the workstations for receiving the orders. The server computer executes a server process that determines an opening price for the product. The server process identifies the oldest of interest at the most aggressive price on each side of the market and selects the older interest of the identified interest to designate as initial interest. The server process matches initial interest against all contra side interest.

25 Claims, 18 Drawing Sheets

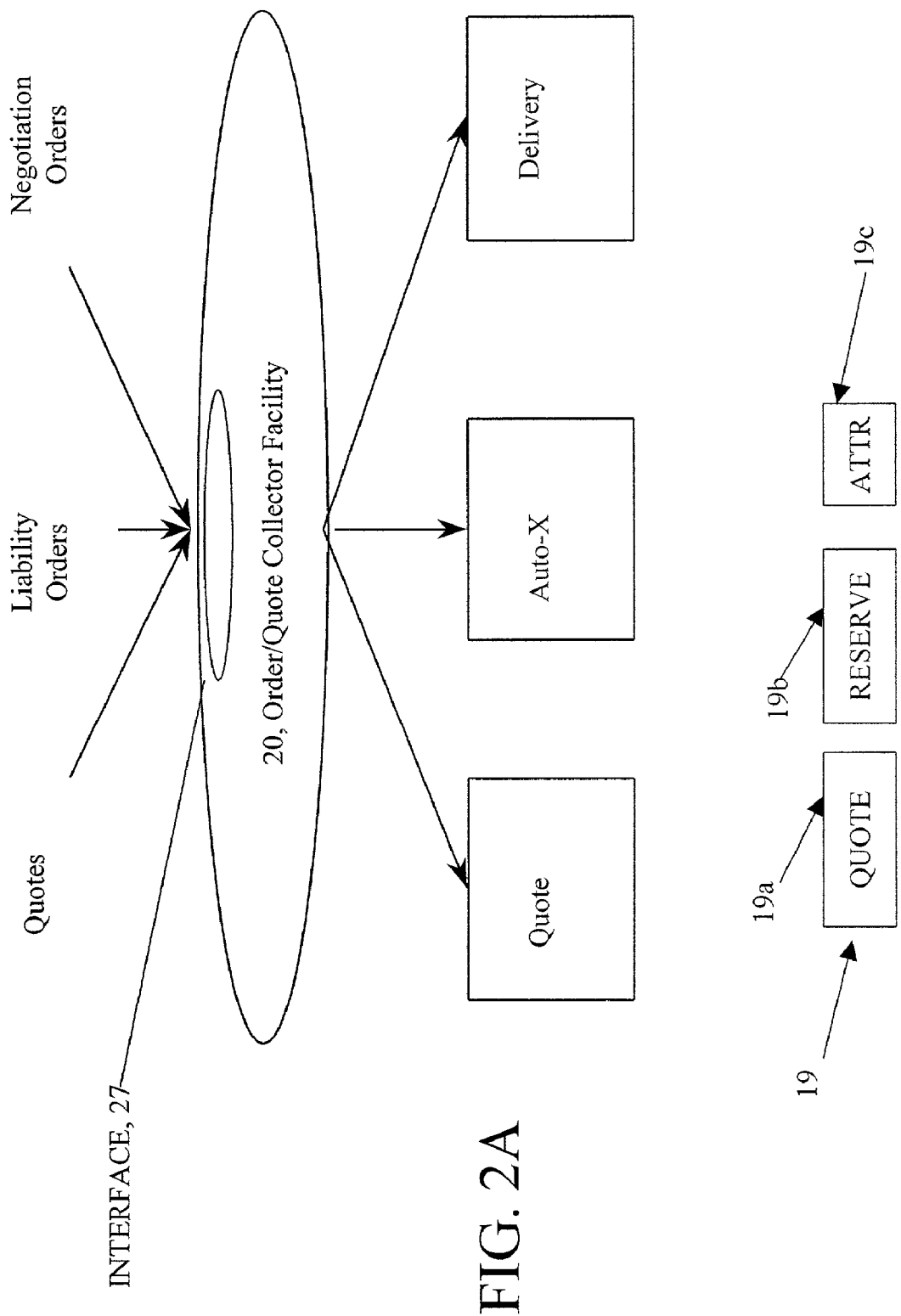

Display Prior to Locked/Crossed Clearing

Inside: $20.03 $20.02 Q 2,000 - 2,000     PCL: $20.01

Last: $20.01 Q +.00   Vol 0   Hi: $20.01  Low: $20.01

| | | | | | | |
|---|---|---|---|---|---|---|
| t11 | 20.01 - 20 | 20.02 - 25 | 20.03 - 20 | 20.02 - 20 | 20.04 - 5 | 20.05 - 10 |
| t11 | MLCO | $20.03 | 1,000 | MADF | $20.02 | 1,000 | t1 |
| t12 | FBCO | $20.03 | 1,000 | RSSF | $20.02 | 1,000 | t2 |
| t10 | GSCO | $20.02 | 2,500 | SBSH | $20.04 | 500 | t3 |
| t7 | ECN1 # | $20.01 | 1,000 | FBCO | $20.05 | 300 | t4 |
| t8 | SBSH | $20.01 | 1,000 | GSCO | $20.05 | 300 | t5 |
| t9 | ECN2 # | $20.00 | 2,500 | MLCO | $20.05 | 400 | t6 |

FIG. 6A

Display After Locked/Crossed Clearing

Inside: $20.02  $20.04  Q  2,000 - 500        PCL: $20.01

Last: $20.03  Q  +.02  09.30  Vol  2,000  Hi: $20.03  Low: $20.03

| 20.00 - 25 | 20.01 - 20 | 20.02 - 20 |     | 20.04 - 5 | 20.05 - 10 | 20.06 - 5 |

| | | | | | | |
|---|---|---|---|---|---|---|
| GSCO  | $20.02 | 2,000 | | SBSH   | $20.04 | 500 |
| ECN1 # | $20.01 | 1,000 | | FBCO   | $20.05 | 300 |
| SBSH  | $20.01 | 1,000 | | GSCO   | $20.05 | 300 |
| ECN2 # | $20.00 | 2,500 | | MLCO   | $20.05 | 400 |
|       |        |       | | ECN #1 | $20.06 | 500 |

FIG. 6B

Display Prior to Locked/Crossed Clearing

Inside: $20.04 $20.02 Q 5000 - 1,000          PCL: $20.01

Last: $20.01 Q +.00   Vol 0   Hi: $20.01  Low: $20.01

| | 20.00 - 25 | 20.01 - 55 | 20.04 - 50 | | | 20.02 - 45 | 20.03 - 10 | 20.04 - 5 | |
|---|---|---|---|---|---|---|---|---|---|
| t11 | MLCO | $20.04 | 5,000 | | MADF | $20.02 | | 1,000 | t3 |
| t12 | FBCO | $20.01 | 1,000 | | MADF | $20.02 | | 3,500 | t13 |
| t10 | GSCO | $20.01 | 2,500 | | RSSF | $20.03 | | 1,000 | t2 |
| t7 | ECN1 # | $20.01 | 1,000 | | SBSH | $20.04 | | 500 | t1 |
| t8 | SBSH | $20.01 | 1,000 | | FBCO | $20.05 | | 300 | t4 |
| t9 | ECN2 # | $20.00 | 2,500 | | GSCO | $20.05 | | 300 | t5 |
| | | | | | MLCO | $20.06 | | 400 | t6 |

FIG. 7A

Display After Locked/Crossed Clearing

Inside: $20.01 $20.02 Q 1,000 - 500     PCL: $20.01

Last: $20.04 Q +.03 09.30 Vol 500 Hi: $20.04 Low: $20:01

| 19.99 - 1 | 20.00 - 25 | 20.01 - 55 | | 20.02 - 5 | 20.03 - 10 | 20.04 - 5 |

| | | |
|---|---|---|
| FBCO | $20.01 | 1,000 |
| GSCO | $20.01 | 2,500 |
| ECN1 # | $20.01 | 1,000 |
| SBSH | $20.01 | 1,000 |
| ECN2 # | $20.00 | 2,500 |
| MLCO | $19.99 | 100 |

| | | |
|---|---|---|
| MADF | $20.02 | 500 |
| RSSF | $20.03 | 1,000 |
| SBSH | $20.04 | 500 |
| FBCO | $20.05 | 300 |
| GSCO | $20.05 | 300 |
| MLCO | $20.05 | 400 |

FIG. 7B

Display Prior to Locked/Crossed Clearing

Inside:   $20.04  $20.02  Q 500 - 1,000       PCL: $20.01

Last: $20.01  Q +.00   Vol 0   Hi: $20.01  Low: $20:01

| | 20.00 - 25 | 20.01 - 55 | 20.04 - 5 | | | 20.02 - 10 | 20.03 - 10 | 20.04 - 5 | |
|---|---|---|---|---|---|---|---|---|---|
| t11 | MLCO | | $20.04 | 500 | t3 | MADF | | $20.02 | 1,000 |
| t12 | FBCO | | $20.01 | 1,000 | t2 | RSSF | | $20.03 | 1,000 |
| t10 | GSCO | | $20.01 | 2,500 | t1 | SBSH | | $20.04 | 500 |
| t7 | ECN1 # | | $20.01 | 1,000 | t4 | FBCO | | $20.05 | 300 |
| t8 | SBSH | | $20.01 | 1,000 | t5 | GSCO | | $20.05 | 300 |
| t9 | ECN2 # | | $20.00 | 2,500 | t6 | MLCO | | $20.05 | 400 |

FIG. 8A

Display After Locked/Crossed Clearing

Inside:  $20.01  $20.03  Q  1,000 - 500        PCL:  $20.01

Last:  $20.04  Q  +.03  09.30  Vol  5000  Hi: $20.04  Low: $20:02

| 19.99 - 1 | 20.00 - 25 | 20.01 - 55 | | 20.03 - 5 | 20.04 - 5 | 20.05 - 6 |

| | | |
|---|---|---|
| FBCO | $20.01 | 1,000 |
| GSCO | $20.01 | 2,500 |
| ECN1 # | $20.01 | 1,000 |
| SBSH | $20.01 | 1,000 |
| ECN2 # | $20.00 | 2,500 |
| MLCO | $19.99 | 100 |

| | | |
|---|---|---|
| RSSF | $20.03 | 500 |
| SBSH | $20.04 | 500 |
| FBCO | $20.05 | 300 |
| GSCO | $20.05 | 300 |
| MLCO | $20.06 | 400 |

FIG. 8B

Display Prior to Locked/Crossed Clearing

Inside:  $20.10  $20.02  Q 1,000 - 2,000        PCL: $20.01

Last: $20.01  Q +.00   Vol  0   Hi: $20.01  Low: $20:01

| | | 20.01 - 10 | 20.09 - 35 | 20.10 - 10 | | | 20.02 - 20 | 20.04 - 5 | 20.05 - 10 | |
|---|---|---|---|---|---|---|---|---|---|---|
| t21 | MLCO | | | $20.10 | 1,000 | MADF | | | $20.02 | 1,000 | t3 |
| t20 | FBCO | | | $20.09 | 1,000 | RSSF | | | $20.02 | 1,000 | t15 |
| t19 | GSCO | | | $20.09 | 2,500 | SBSH | | | $20.04 | 500 | t16 |
| t2 | ECN1 # | | | $20.01 | 1,000 | FBCO | | | $20.05 | 300 | t4 |
| t5 | SBSH | | | $20.00 | 1,000 | GSCO | | | $20.05 | 300 | t17 |
| t7 | ECN2 # | | | $19.99 | 2,500 | MLCO | | | $20.05 | 400 | t18 |
| | | | | | | MM1 | | | $20.06 | 200 | t10 |
| | | | | | | MM2 | | | $20.06 | 100 | t13 |
| | | | | | | MM3 | | | $20.07 | 400 | t8 |
| | | | | | | MM4 | | | $20.08 | 500 | t6 |
| | | | | | | MM5 | | | $20.08 | 1000 | t12 |
| | | | | | | MM6 | | | $20.08 | 300 | t14 |
| | | | | | | MM7 | | | $20.09 | 100 | t11 |
| | | | | | | MM8 | | | $20.10 | 500 | t9 |
| | | | | | | MM9 | | | $20.10 | 100 | t1 |

FIG. 9A

Display After Locked/Crossed Clearing

Inside: $20.01 $20.08 Q 1,000 - 1,500    PCL: $20.01

Last: $20.09 Q +.08 09.30 Vol 4,500 Hi: $20.10 Low: $20:09

| 19.99 - 25 | 20.00 - 10 | 20.01 - 10 | | 20.08 - 15 | 20.09 - 1 | 20.10 - 6 |

| | | | | | | |
|---|---|---|---|---|---|---|
| ECN1 # | $20.01 | 1,000 | | MM4 | $20.08 | 200 |
| SBSH | $20.00 | 1,000 | | MM5 | $20.08 | 1000 |
| ECN2 # | $19.99 | 2,500 | | MM6 | $20.08 | 300 |
| | | | | MM7 | $20.09 | 100 |
| | | | | MM8 | $20.10 | 500 |
| | | | | MM9 | $20.10 | 100 |

FIG. 9B

Display Prior to Locked/Crossed Clearing

Inside: $20.04 $20.02 Q 4000 - 1,000   PCL: $20 01

Last: $20.01 Q +.00   Vol 0   Hi: $20.01   Low: $20:01

| 20.00 - 10 | 20.01 - 10 | 20.04 - 40 | | 20.02 - 10 | 20.03 - 10 | 20.04 - 5 | |
|---|---|---|---|---|---|---|---|
| | | | Reserve | | | | Reserve |
| t2 | MLCO | $20.04 | 500 | MADF | $20.02 | 1,000 | t10 |
| t3 | FBCO | $20.04 | 1,000 | RSSF | $20.03 | 1,000 | t12 |
| t11 | GSCO | $20.04 | 2,500 | SBSH | $20.04 | 500 | t1 |
| t7 | ECN1 # | $20.01 | 1,000 | FBCO | $20.05 | 300 | t4 |
| t8 | SBSH | $20.00 | 1,000 4,000 | GSCO | $20.05 | 300 5,000 | t5 |
| t9 | ECN2 # | $19.99 | 2,500 1,000 | MLCO | $20.06 | 400 2,000 | t6 |
| | | | 1,000 | | | | 5,000 |

FIG. 10A

Display After Reserve Trading

Inside: $20.01 $20.04 Q 1000 - 500    PCL: $20.01

Last: $20.04 Q +.03  Vol 10000  Hi: $20.04  Low: $20:02

| 19.99 - 25 | 20.00 - 10 | 20.01 - 10 | | 20.04 - 5 | 20.05 - 6 | 20.06 - 4 |
|---|---|---|---|---|---|---|

Reserve                                                   Reserve

ECN1 #    $20.01    1,000         0         SBSH    $20.04    500    * ???
SBSH      $20.00    1,000                   FBCO    $20.05    300
ECN2 #    $19.99    2,500                   GSCO    $20.05    300
                                            MLCO    $20.06    400    4,000

* or 1000 display, 3500 reserve?

FIG. 10B

OPENING PRICE PROCESS FOR TRADING SYSTEM

BACKGROUND

This invention relates to determining an opening price in an automated trading system for trading products such as equity securities.

In any trading system or market, there exists the possibility that at the opening of trading, the volume and prices of buy orders will not balance the volume and prices of sell orders. This could occur for many reasons or for no apparent reason. For example, events may trigger buying or selling pressure in a particular security or the market in general. Also simple fluctuations in supply/demand could produce an imbalance at the opening.

In an electronic market that uses a dealer model, a lock/cross condition can exist at the opening. In a locked situation, a market participant enters a quote or order having a bid price that is the same as the best, i.e., lowest displayed offer or enters an offer price that is the same as the best, i.e. highest displayed bid quote price. In a crossed situation, the quote or order bid price for the security is higher than, i.e., crosses the offer quoted price, or conversely the quote or order has an offer price that is lower than the currently best displayed bid price. Locked/crossed conditions are undesirable for maintaining orderly markets.

SUMMARY

According to an aspect of the invention, a method of determining an opening price for a product traded in a trading system is executed over a distributed network computer system. The method includes detecting a lock/cross condition in the market prior to opening and removing the lock/cross condition to allow opening of trading in the particular product. Removing includes identifying the oldest of interest at the most aggressive price on each side of the market and selecting the older interest of the identified interest to designate as initial interest. The method matches initial interest against all contra side interest.

According to an additional aspect of the invention, a computer program product removes a lock/cross condition to allow opening of trading in a security. The computer program product resides on a computer readable medium and includes instructions for causing a computer to identify the oldest of interest at the most aggressive price on each side of the market and select the older interest of the identified interest to designate as initial interest. The computer program product also matches initial interest against all contra side interest.

According to an additional aspect of the invention, a system for determining an opening price for products traded over a distributed, networked computer system, includes a plurality of workstations for entering orders for financial products into the distributed, networked computer system and a server computer coupled to the workstations for receiving the orders. The server computer executes a server process that determines an opening price for the product. The server process includes instructions that cause the server to identify the oldest of interest at the most aggressive price on each side of the market and select the older interest of the identified interest to designate as initial interest. The server process also matches initial interest against all contra side interest.

One or more of the following advantages may be provided by one or more aspects of the invention.

The opening price process provides several advantages for investors and other participants. The opening price process results in an opening price that is rationally related to market forces that exist at the opening. Another advantage is that the process is easier to explain to, and will be better understood by, investors by making results more predictable. This should provide more confidence to investors participating in the market. The process at the same time rewards more aggressive bidders and offerers, while encouraging market participants to enter the market for a given security earlier. Other features include matching interest in a manner that is consistent with intraday trading methodology and eliminating trade through situations that can occur in prior approaches. Also with this technique price improvement accrues to older orders.

BRIEF DESCRIPTION OF THE DRAWINGS

FIG. 1A is a diagram showing a format for quotes.

FIG. 2A is a block diagram showing arrangement of an quote/order collector facility.

FIGS. 6A-6B through 10A-10B are diagrams of montages.

DESCRIPTION

Figure 1:
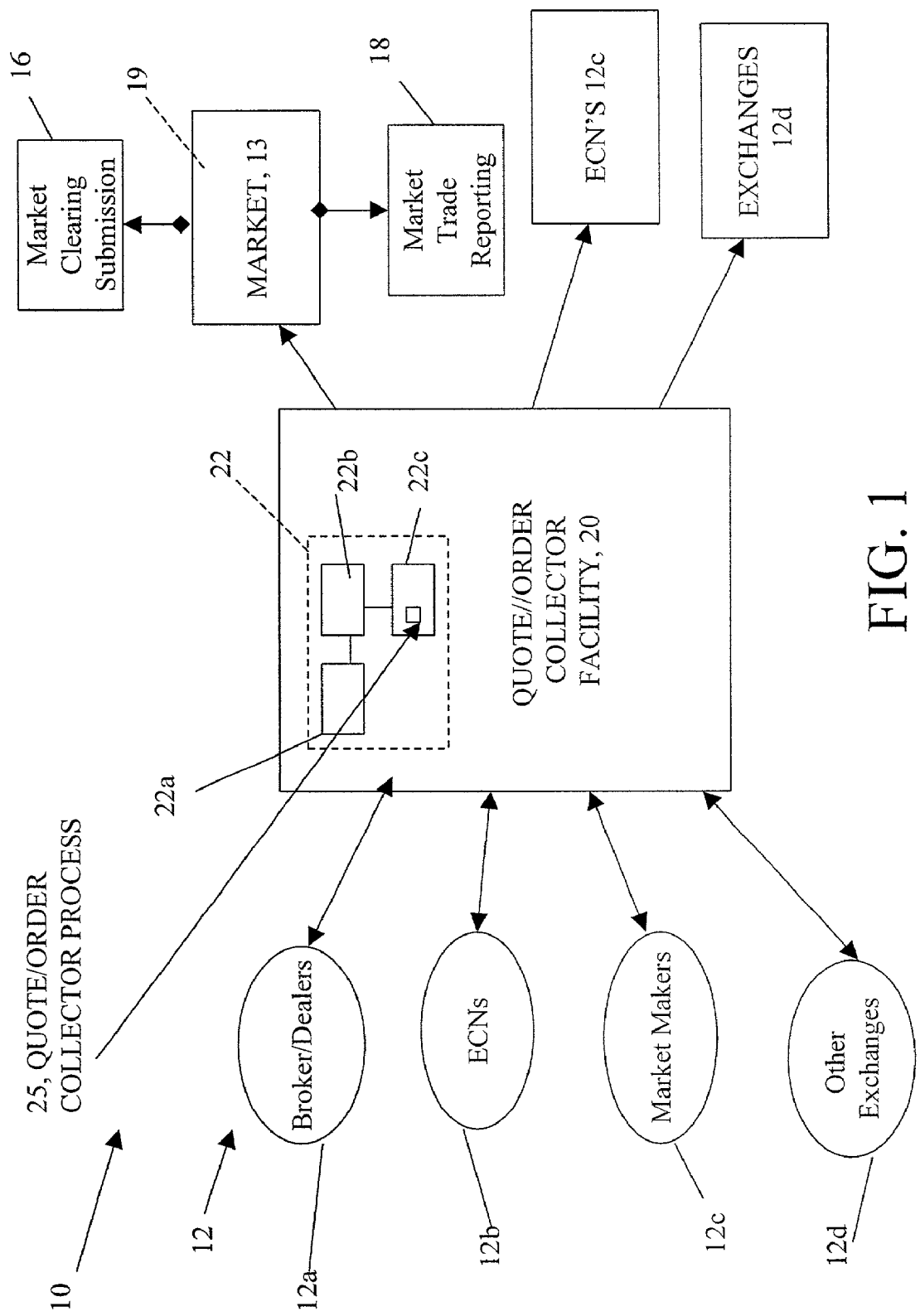
FIG. 1 is a block diagram of a market system.

Referring to FIG. 1, one example of an electronic market 10 is shown. Although the opening process to be described below is applicable in many types of markets the electronic market 10 will be used as an illustrative example. The electronic market 10 includes client systems 12 that access a central quote/order collector facility 20. The client systems 12 can be broker/dealer systems 12$a$, electronic communication networks (ECN's) 12$b$, market-marker systems 12$c$, and other exchanges 12$d$. The connections can use existing Nasdaq protocols such as SelectNet®, Small Order Execution System$^{SM}$ (SOES$^{SM}$), or equivalent.

The client systems 12 include a processor, memory and a storage device, e.g., a client workstation or personal computer (all not shown) that can include a client process to enter quotes/orders into the electronic market system. The quote/order collector facility 20 causes the order execution or order delivery systems (e.g., SOES$^{SM}$ and SelectNet®) to deliver executions or orders to a market that is coupled to a clearing system 16 and a reporting system 18. It also causes delivery of executions or routing of orders to the ECN's 12$c$, depending on the status of the ECN, and routing of orders or executions to other markets and exchanges 12$d$.

The quote/order collector facility 20 is comprised of one or preferably a plurality of server computers generally denoted as 22 including a processor 22$a$, main memory 22$b$ and storage 22$c$. The storage system 22$c$ includes quote/order collector process 25 that is executed in memory 22$b$. In general, server 22 is a complex computer server, the details of which are not important to an understanding of the present invention.

The quote/order collector facility 25 collects pre-trade information in the form of quotes or orders. The distinction between a quote and an order depends on several factors. For example, each a market maker can send a proprietary quote, i.e., a quote that represents its own trading interest or an agency quote that represents trading interest of a sponsored entity. If one proprietary quote is sent it could be considered one order. If one agency quote is sent it also could be considered one order. If an agency quote reflects an aggregation of more than one agency order, however, the aggregate agency order could be considered a quote. Entering quotes are limited to registered market makers 12b and ECNs 12c and possible UTP Exchanges 12d. For any given stock, a registered market maker or ECN may directly enter a non-marketable order, i.e., quote into the system 20 on behalf of its own account or for the account of a customer, or it may sponsor the direct entry of an order by its customer. All sponsored quotes are sent to the quote/order collector facility 20 under the name of the sponsoring market maker or ECN. Every registered market maker or ECN will be permitted to submit an unlimited number of non-marketable quotes to the system 20.

As shown in FIG. 1A, each quote 19 submitted to the system can include a display quote size 19a, a reserve size 19b and an indication 19c (ATTR) of whether the quote size is attributable or non-attributable. Quote size 19a when attributable based on indicator 19c, is directly attributable to the market maker or ECN, and is placed next to its unique market participant ID, and is displayed in a "current quote" montage. Quote size 19b when non-attributable is sized that the market maker or ECN wishes to display to the marketplace through an aggregate montage of the order display window. This quote size 19a is not attributable to the market maker or ECN until it is executed. Reserve size 19b is liquidity that is not displayed to the marketplace but that is immediately accessible through the quote/order collector facility 20. In order to use reserve size 19b, a market maker can be required to have a minimum amount displayed in the aggregate quote size 19a without or with attributable indicator 19c and negotiation quote with attributable indicator 19c asserted.

A broker/dealer can receive an order from a customer. The broker/dealer can send that order to the order collector facility 20 to be executed with quotes that are posted by electronic communication networks, market makers or other markets. In this embodiment, orders of broker/dealers are not posted as quotes.

Order Collector Facility

Referring to FIG. 2A, the quote/order collector facility 20 receives quotes, liability orders, (non-liability orders) and directed orders from market participants. The quote/order collector facility 20 allows a quote/order to be displayed in the market, and also allows for marketable orders to be executed or routed to market participants.

The order quote collector facility 20 also includes an interface 21 that couples the order collector facility 20 to existing systems. For example, the interface 21 can couple the order quote collector facility 20 to an order execution system, e.g., the Small Order Execution System$^{SM}$ (SOES$^{SM}$) and to a negotiation system, e.g., SelectNet®. The interface 21 would provide access to information contained in order flow delivered via the delivery systems to a quote/order collection process 25 described in conjunction with FIG. 2B. The OCF 20 can also include an internal matching/execution engine.

In general, the electrical and logical functions which comprise the interface 21 can be similar to the ones currently existing in the SOES$^{SM}$/SelectNet® systems or equivalents. The interface 21 or the process 25 would extract information from the quotes and make that information available to the quote order collector process 25. The quote/order collector process 25 extracts information and process orders in a unified manner to allow the order collector system 20 to be a unifying point of collection of all orders which are sent to the market 10.

The interface 21 can also be used to route executions of liability orders back to market participants whose quotes/orders were executed against and can deliver orders for negotiation against market participants whose quotes are selected for further negotiation via the SelectNet® system or equivalent.

Figure 2B:
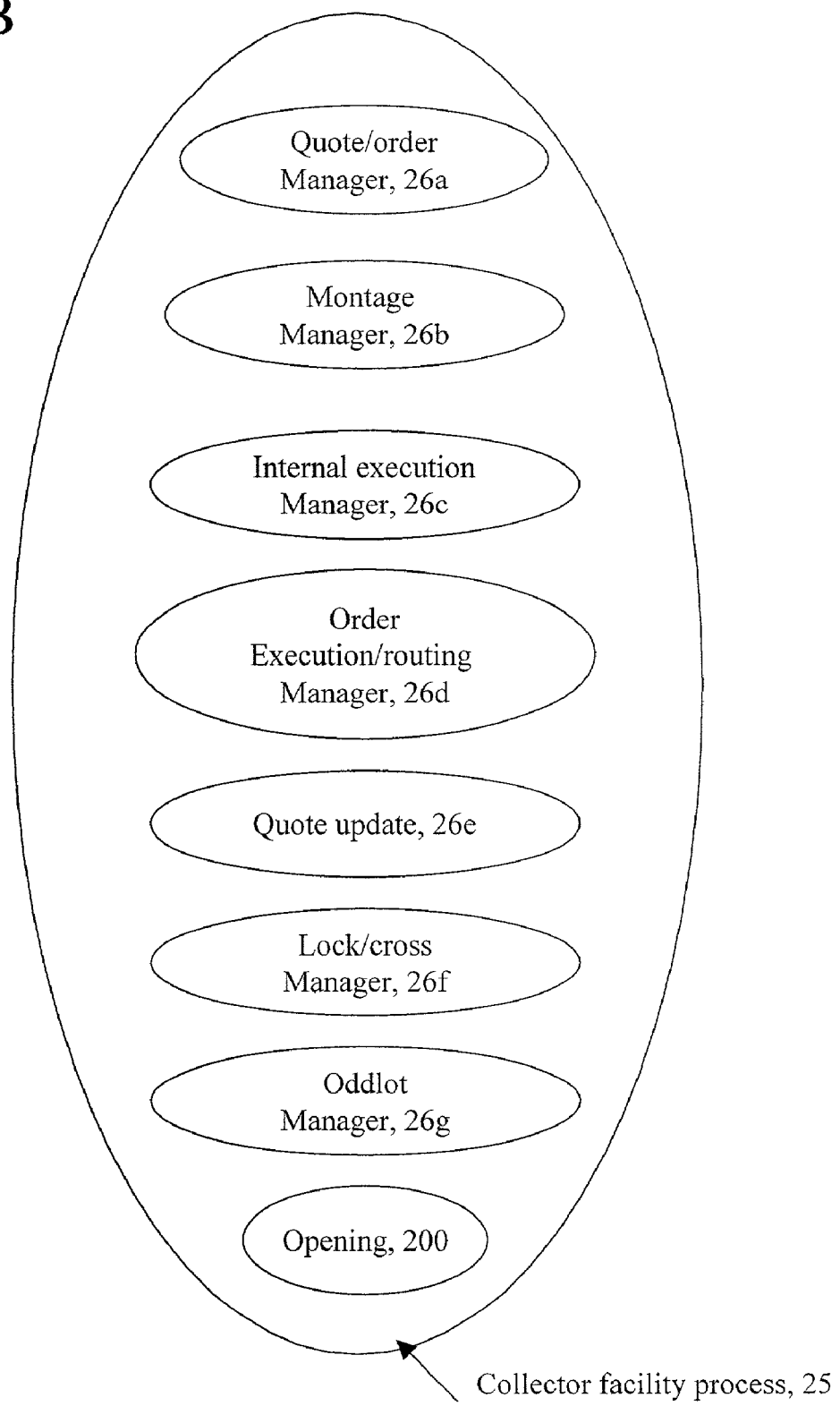
FIG. 2B is a logic view of functions in the quote/order collector facility.

Referring to FIG. 2B, the quote/order collector process ("OCP") 25 is shown. The quote/order collector process 25 provides transmission of multiple orders or quotes at multiple price levels by Quoting Market Participants to a quote/order manager 26a. The quote/order manager 26a provides a unified point of entry of quotes and orders from disparate delivery systems into the quote/order collector facility 20 to access quotes/orders displayed (as either attributable or non-attributable) in both the aggregate montage and current quote montage. The quote/order manager 26a manages multiple quotes/orders and quotes/orders at multiple price levels and uses a montage manager 26b to display (either in the Aggregate montage or in the current quote montage) the orders/quotes consistent with an order's/quote's parameters.

The order collector process 25 can also includes an internal execution process manager 26c to match off executions for quoting market participants at the best bid/offer. Orders can include a qualifier that allows or disallows an order for match-off, e.g., depending on the trading capacity of the order entry participant. The order collector system 20 also includes an order routing/execution manager 26d that provides a single point delivery of executions or routing of orders, which substantially eliminates potential for dual liability. That is in one embodiment, the order collector process 25 maintains the order routing and execution functionality available in the SOES$^{SM}$ and SelectNet® systems.

The order collector process 25 also can also include a quote update manager 26e, a lock/cross quote manager 26f, and an odd lot execution manager 26g. The order collector process 25 also includes an opening process 200. Alternatively the order collector process 25 can include a reference to the opening process, that is the opening need not be part of the order collector process 25.

Figure 3A:
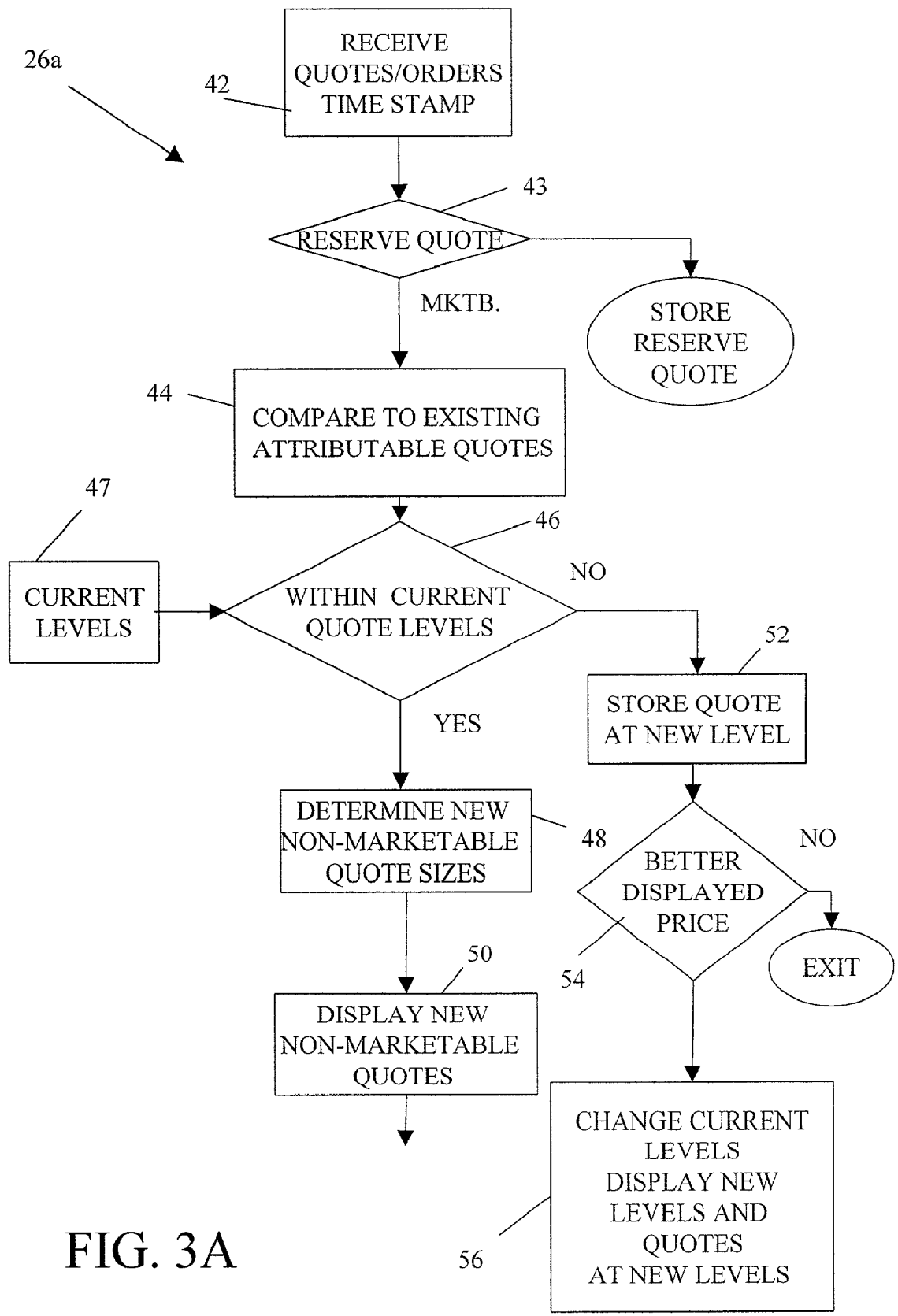
FIG. 3A is a flow chart showing a quote/order manager.

Referring to FIG. 3A, the order collector process 25 receives orders/quotes and time stamps 42 each order/quote upon receipt. This time stamp determines the order's/quote's ranking for interaction with incoming marketable orders. Quotes/orders are designated as either attributable or non-attributable, and could also have a reserve size discussed above. The order collector process 25 aggregates all of a Quoting Market Participant's attributable and non-attributable orders at a particular price level, and disseminates order/quotation information into the aggregate montage and/or the current quote montage, as will be discussed below.

The order entry process 25 determines 43 whether the received quote/order corresponds to a reserve quote. If the quote does not correspond to a reserve quote then the quote is a displayable quote that is attributable or non-attributable. The order entry process 25 compares 44 the received quotes/orders to existing quotes/orders to determine 46 whether the price of quotes/orders fall in existing quote/order price levels. Any number of quote/order price levels can be accommodated although, in this example, only three price levels will be displayable in the non-attributable i.e., aggregate montage. If the quote price is in a displayable price level it is a displayable quote eligible for automated execution. The order collector system 20 can be provided with more price level depth than the three levels, e.g., a depth of 20-25 levels although only a limited number, e.g., three would be displayed at any one time.

If the quote is within one of the pre-defined quote levels, the process 25 determines 48 new non-marketable quote/orders sizes by adding the quote/order size corresponding to the received quote/order to quote sizes at that price level already in the system 20. The process 25 will cause the new non-marketable quote sizes to be displayed 50. If the quote is not within one of the pre-defined quote levels, the process 25 stores 52 the quote at a new price level determines 54 if it is at a better price. If the quote is at a better price, the process 25 changes 56 current levels to cause a new price level for non-marketable quote sizes to be displayed 50.

Figure 3B:
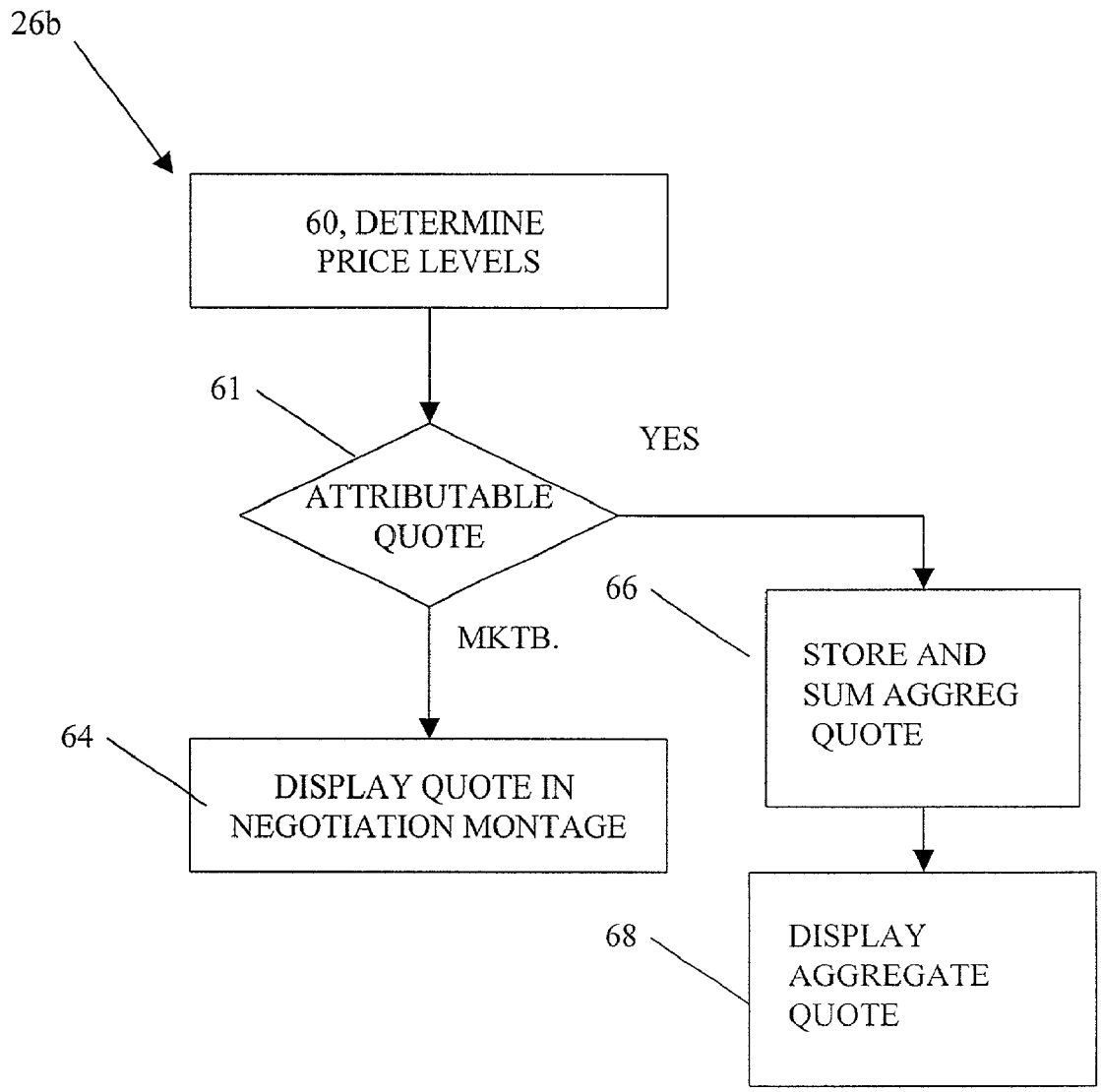
FIG. 3B is a flow chart showing a montage manager.

Referring to FIG. 3B, the montage manager 26 of the quote/order collector process 25 determines 60 which price levels to display 60 and determines 61 if an order is a non-attributable order. If the order is non-attributable, the quote/order collector process 25 will store and sum 66 the quote with like quotes to produce an aggregated quote and display 68 the aggregate size of such orders in the aggregate montage when the orders fall within one of the three top price levels. For attributable orders, the aggregate size of such orders is displayed in the current quote montage once the order(s) at a particular price level becomes the particular quoting market participant's best attributable bid or offer in the current quote montage. This interest will also be aggregated and included in the aggregate montage if it is within the displayed price levels. Market makers and ECNs can have one unique market participant identification "MPID" and possibly an agency MPID against which they can display attributable quotes. If a market maker has an agency quote, attributable orders will be displayed once the order or orders at a particular price level become the market participant's best agency quote.

For example, MMA sends system 20 five 1,000 shares attributable buy orders at $20 and two 1,000 share non-attributable buy orders at $20, for a total interest of 7,000 shares to buy at $20. At some point, the $20 price level becomes the best bid. In this example, if MMA is alone at the inside bid, system 20 will aggregate all of the orders in the system and display as follows: 7,000 shares in the Aggregate montage; 5,000 shares (the attributable portion) in the current quote montage next to MMA's MPID; and 2,000 (the non-attributable portion) in a "SIZE" MPID.

Quote/order collector system 20 provides several advantages to the market. One advantage is that it ensures compliance with the regulatory rules such as the SEC Order Handling Rules, and in particular the Limit Order Display Rule and SEC Firm Quote Rule. With system 20 it is less likely that a Quoting Market Participant, because of system delays and or/fast moving markets, will miss a market because the Quoting Market Participant is unable to quickly transmit to System 20 a revised quote (which may represent a limit order). ECNs may not currently participate in the SOES$^{SM}$ execution system because of the potential for dual liability and assuming proprietary positions. For example, if an ECN matches orders between two subscribers and contemporaneously receives an execution from SOES$^{SM}$ against its quote, the ECN will be required to honor both the internal execution and the SOES$^{SM}$ execution, thus taking on a proprietary position. This issue of liability does not arise in SelectNet® because that system delivers orders which can be declined if the ECN, after scanning its book, determines that the quote was taken out by an internal execution. An ECN cannot decline a SOES$^{SM}$ execution because the system delivers an execution, as opposed to an order.

An ECN, like a market maker, can have the ability to give orders to the system 20. If an internal subscriber wants to access an order in an ECN that is also being displayed in system 20, the ECN can request a cancel before accomplishing the internal match. If the request to cancel is declined because the order was already executed against in system 20, the ECN can decline the internal customer and avoid the potential for dual liability.

The OCF 20 will eliminate virtually all potential for double liability using the disparate execution and delivery systems that exist today because OCF 20 will serve as the single point of order entry and the single point of delivery of all Liability Orders (as well as Non-Liability Orders).

To access quotes in system 20, therefore, order entry firms, market makers, ECNs, or UTP Exchanges, will enter either a directed or non-directed order into the OCF 25. The order may be of any size. The order indicates whether it is a buy, sell, sell short, or sell short exempt. The order is either a priced order or a market order. The system 20 has a separate odd lot process described below.

Nondirected Orders

A market participant can immediately access the best prices in system 20 as displayed in the aggregate montage, by entering a non-directed order into the OCF 25. A non-directed order is an order that is not sent/routed to a particular Quoting Market Participant. A non-directed order is designated as a market order or a marketable limit order and is considered a "Liability Order" and treated as such by the receiving market participant. Additionally, the order entry participant can obtain the status of the order and request a cancel of such order. Further, in some embodiments, the market 10 allows market participants that enter Non-Directed Orders three options as to how the order interacts with the quotes/orders in the system 20. These choices are that the orders can execute against displayed contra side interest in strict price/time; or price/size/time; or price/time that accounts for ECN access fees.

Upon entry, the OCF 25 will ascertain what market participant is the next Quoting Market Participant in queue to receive an order based on the entering MP's ordering choice, and depending on how that receiving Quoting Market Participant participates in system 20 (i.e., automatic execution v. order delivery), the OCF 25 will either cause delivery of an execution (via SOES$^{SM}$) or delivery of a Liability Order (via SelectNet®).

Also in some embodiments, the market 10 can have a class of orders referred to as preferred orders. A preferenced order is an order that is preference to a particular quoting market participant e.g., market maker or ECN. Preferenced Orders can be of two types price restrictions or no price restrictions. Preferenced Orders of either type are entered into the system 20 through the Non-Directed Order Process. The market participant entering the Preferenced Order designates the quoting market participant by its identification symbol ("MPID"). Preferenced Orders are processed in the same "queue" as Non-Directed Orders and are sent from the queue when the preferenced quoting market participant quote satisfies the order.

For example, if MMA and ECN1 (non-automatic exception participant) are at the inside bid each displaying 1,000 shares at $20, and OE Firm A enters a market order to buy 1,000 shares, assuming that MMA is first in time priority, the OCF 25 will route the order into the SOES$^{SM}$ and deliver an execution of 1,000 shares to MMA via the SOES$^{SM}$. If another market order to buy 1,000 shares is entered into the system, the OCF 25 will deliver a Liability Order to ECN1. If ECN1 had opted to take automatic execution, the OCF would have delivered an execution to ECN1 via the SOES$^{SM}$.

Order Execution Manager

Figure 4A:
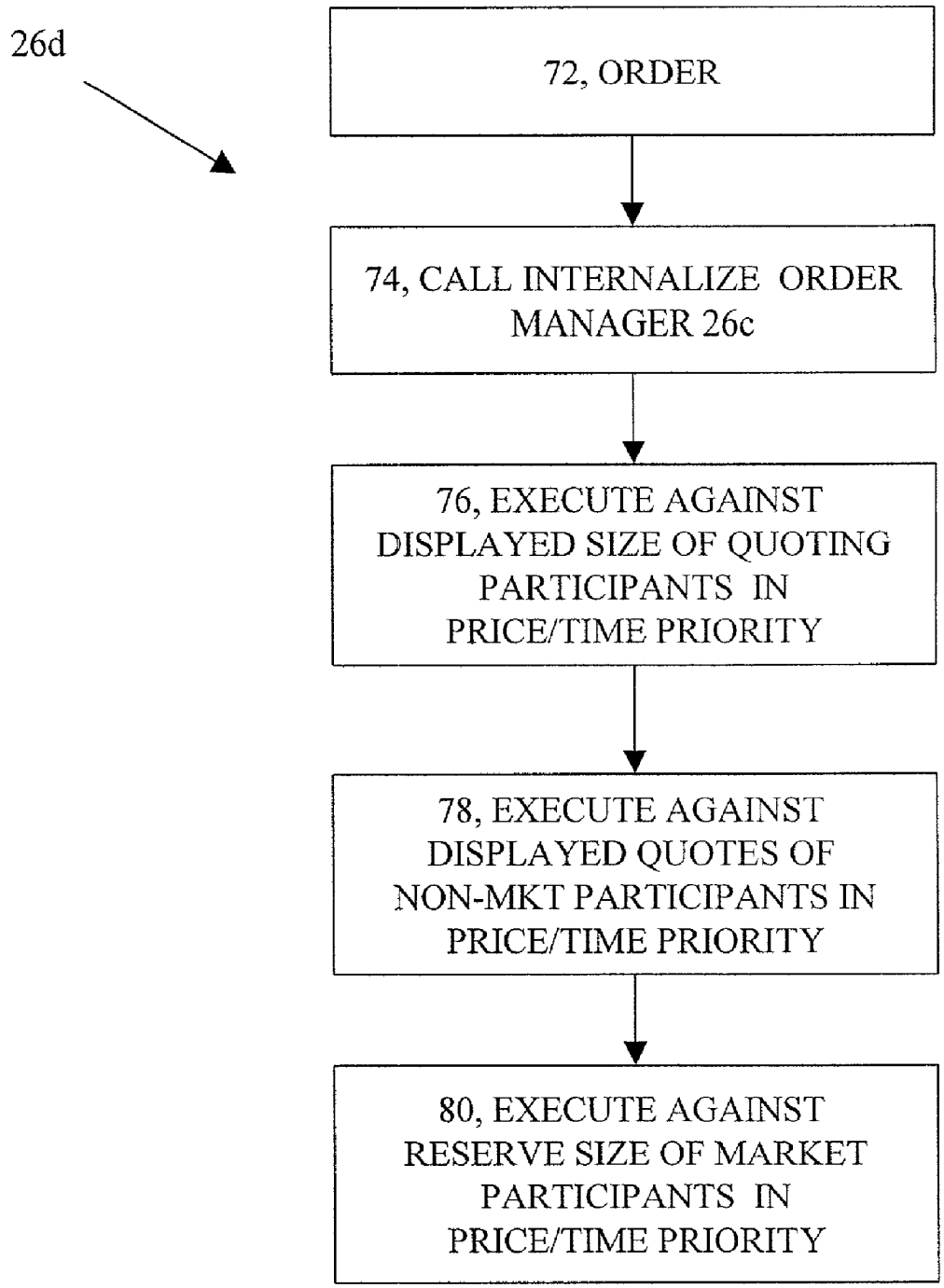
FIGS. 4A-4B are flow charts of an execution/routing manager.

Referring to FIG. 4A, an exemplary order execution/routing manager 26d executes non-directed orders against Quoting Market Participant's quotes/orders based on, e.g, price/time priority. As noted above, other priorities can be used and the execution/routing manager 26d would be so modified. Each quote/order when entered into the OCF 25 receives a time stamp. The order execution/routing manager 26d will deliver all orders at the best bid/best offer generally in strict time priority based on the time stamp of the order/quote, subject to the order execution choice preferencing features, and self matching feature, with the exception that order execution/routing manager 26d will first attempt to provide a match off of orders/quotes entered by a Quoting Market Participant if the participant is at the best bid/best offer by calling 74 an internal execution manager 26c. Thus, the order execution/routing manager 26d will call the internal order execution manager 26c to try to match off a Quoting Market Participant's orders and quotes that are in the system if the participant is at the BBO and receives a market or marketable limit order on the other size of the market.

Generally, the order execution/routing manager 26d will attempt to execute 76 against all displayed size (attributable and non-attributable) at a particular price level for market participants such as market makers and ECN's. There does not need to be an interval delay between the delivery of executions against a market maker's quote (assuming the market maker has size to access) because all Quoting Market Participants may quote their actual size and may give multiple orders and price levels. As shown herein the market maker proprietary orders receive preference over agency orders. However, preference could be given to agency orders before market maker orders.

Once displayed size in system 20 is exhausted, the order execution/routing manager 26d will attempt to access the quotes of UTP Exchanges. After accessing the displayed size of Quoting Market Participants and UTP Exchanges 78, order execution/routing manager 26d will attempt to execute 80 against the reserve size of Quoting Market Participants generally in price/time priority, subject to the exceptions noted above.

In an alternate embodiment, the order execution/routing manager 26d can distinguish between exchanges that support auto execution and exchanges that do not support auto execution giving preference for the former. Additionally, in such an embodiment, UTP exchanges can have reserve size and the system 20 can distinguish between exchanges that support auto execution and those ECN's, and then exchanges that do not support auto execution.

In another embodiment the order execution/routing manager 26d can first access quotes of market makers and auto-execution ECN's, next access quotes of market makers and ECN's for delivery of orders, then the reserve size of market makers and ECN's and UTP exchanges. Other arrangements priorities, etc. are possible taking into consideration how participants participate in the market 10, choices of how orders interact in the market 10, the system or customer choices.

Figure 4B:
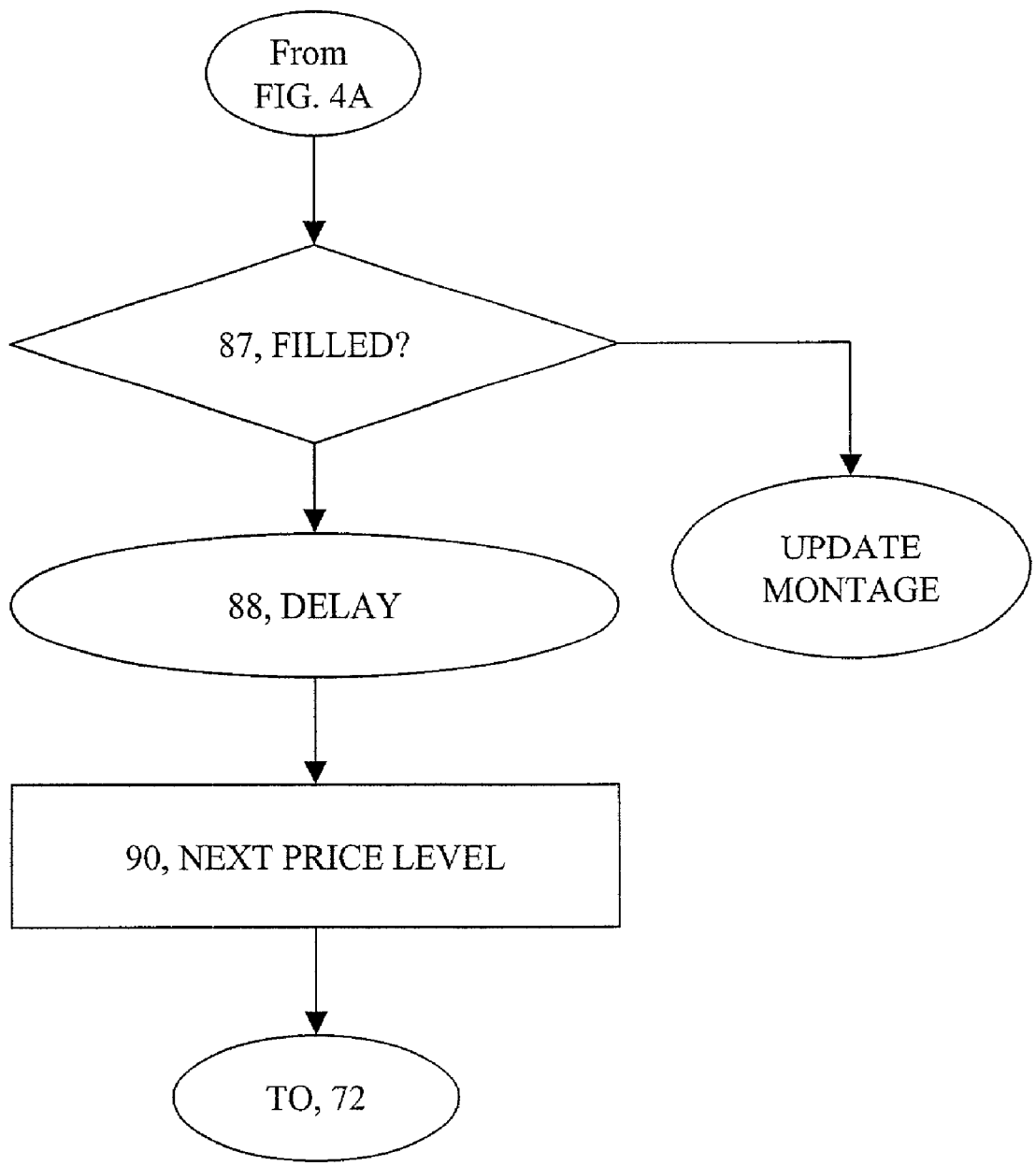

Referring to FIG. 4B, if the order is not filled 87, the order execution/routing manager 26d will move 90 to the next price level, immediately in one embodiment, or in another embodiment, after a predefined delay, e.g., a 5 second interval delay 88 before attempting to execute an order at the new price level. The price-level interval delay will give market participants time to adjust their quotes and trading interests before the market moves precipitously through multiple price levels, which may occur when there is news, rumors, or significant market events. Thus, the price-level interval delay is a modest and reasonable attempt to limit volatility.

For non-directed orders that are mixed orders or odd lot orders the collector facility process 25 (FIG. 2B) calls an odd-lot execution manager 26f.

Opening Price Process

Figure 5:
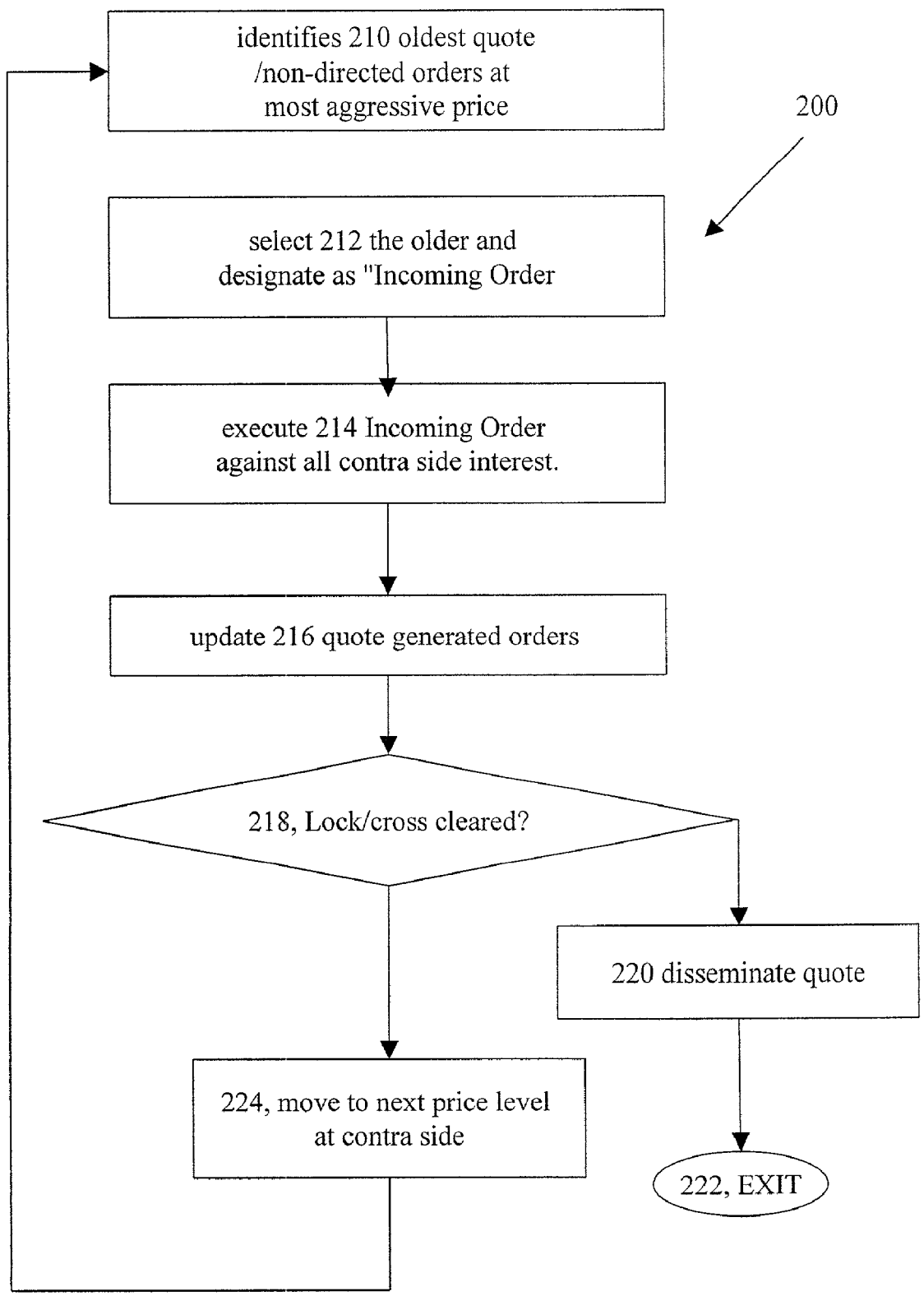
FIG. 5 is a flow chart showing an opening process.

Referring to FIGS. 5A and 5B, a process 200 for determining an opening price for a product such as a security is shown. The process 200 can be used in automated trading systems, markets or exchanges that receive quotes or orders prior to the opening of trading for the day. The process 200 is especially useful in the market system 10 of FIG. 1. The process can be used to commence trading in a security and can use or be part of the order collector facility 20 and order collector process 25 of FIGS. 2A, 2B.

The opening process 200 generally works on a per security basis. Prices for orders or quotes are entered into the system prior to market or exchange opening. Prior to opening, the market 10 detects a lock/cross condition amongst orders or quotes in the system. The market 10 will call the opening process 200 to remove the lock/cross condition to allow opening of trading in the particular security.

The opening process 200 identifies 210 the oldest of all quote-generated and non-directed, priced orders at the most aggressive price on each side (bid side and offer side) of the market. The most aggressive orders in this example would be the order having the highest bid price and the order having the lowest offer price. When the most aggressive bid price equals the most aggressive offer price the market is said to be locked. When the most aggressive bid price exceeds the most aggressive offer price the market is said to be crossed. Neither, condition is desirable for maintaining orderly markets.

Of the oldest bid or offer identified quotes or orders the process selects 212 the older of the two and designates that quote or order as initial interest or as described below as the "Incoming Order." The process 200 executes 214, i.e., matches the Incoming Order against all contra side interest, e.g., book orders. The process can first call the internalizing process 26c to execute orders against contra side interest of a market participant at the best price and which has a ID matched to the order. The process executes any remaining orders (or all if the internalizer did not execute any interest) in a particular priority. One preferred priority is Price/Time priority, however price/size or price with some other condition can alternatively be used. At each price level, all displayed size is execute first, followed by any reserve size, in the order in which displayed size was executed. In all cases, the executions occur at the price of the book orders, so that any price improvement accrues to the initial interest, i.e., the Incoming Order.

The system updates 216 quote-generated orders, as appropriate, but does not disseminate quotes. The system tests 218 whether the lock/cross condition has been removed. If the condition was removed, the process disseminates 220 opening bid and offer quotes, which are the quotes that remain at the top of the bid and offer sides of the market. The opening process 200 exits 222. If the condition has not been removed the process repeats for the next price level 224.

Several advantages are provided from this type of opening process 200. One advantage is that the process 200 is easier to explain to and will be better understood by investors making results more predictable and resulting in more confidence in the market place. The process 200 at the same time rewards more aggressive bidders and offerers, while encouraging market participants to enter the market for a given security earlier. Other features include matching interest in a manner that is consistent with intraday trading methodology and eliminating trade through situations that can occur in prior approaches. Also with this technique price improvement accrues to older orders. Trade through occurs when a quote or order is skipped in trading. Below are several examples of the opening process.

Referring to FIGS. 6A and 6B, in this scenario quotes from market participants GSCO, MLCO and FBCO lock/cross the market (FIG. 6A). The "t" designations next to the quote indicates a time stamp with the lower number being the oldest. The process 200 will match quotes at t1 and t11 for 1000 shares @20.03 per share and t2 and t12 for 1000 shares @20.03. Thereafter, the locked condition is cleared and the process can disseminate a bid quote of 20.02 at 2000 shares, and an offer quote of 20.04 at 500 shares. The montage will have the values displayed as in FIG. 6B with the locked quotes GSCO, MLCO and FBCO trading interest cleared and the quote summary updated.

Referring to FIGS. 7A and 7B. in this scenario quotes market participant MLCO enters a bid that crosses the market (FIG. 7A). The process 200 matches t3 and t11 for 500 shares @20.04, which clears the cross condition leaving FBCO at $20.01 on the bid side for a size of 1,000 and MADF on the offer side at $20.02 with a size of 500 (FIG. 7B).

The system 10 would generate the following execution report.

| Execution reports: | | | |
|---|---|---|---|
| Buyer | Seller | Size | Price |
| MLCO | MADF | 500 | $20.04 |

Referring to FIGS. 8A and 8B, in this scenario MLCO enters a bid that crosses market. Participant MADF increases its original offer (t3) by 3500 shares (t13) (FIG. 8A). The process 200 matches t3 and t11 for 1000 shares @20.04, matches t13 and t11 for 3500 shares @20.02 and matches t2 and t11 for 500 shares @20.04. These matches clear the lock/cross condition leaving FBCO at $20.01 on the bid side for a size of 1,000 and RSSF offer @$20.03 with a size of 500 (FIG. 8B).

Referring to FIGS. 9A and 9B, in this scenario GSCO, MLCO and FBCO enter bids that lock/cross market. This is example where there are a large number of bids/offers locked/crossed (FIG. 9A). The process 200 matches t3 and t21 for 1000 shares @20.10, matches t15 and t19 for 1000 shares @20.09, matches t16 and t19 for 500 shares @20.09; matches t4 and t19 for 300 shares @20.09; matches t17 and t19 for 300 shares @20.09; matches t18 and t19 for 400 shares @20.09; matches t10 and t20 for 200 shares @20.09; matches t13 and t20 for 100 shares @20.09; matches t8 and t20 for 400 shares @20.09; and matches t6 and t20 for 300 shares @20.09. These matches clear the lock/cross condition leaving ECN1 # at $20.01 with a size of 1,000 on the bid side and participant MM4 at $20.08 with a size of 200 (FIG. 9B).

Referring to FIGS. 10A and 10B, in this scenario Display and Reserve size are traded together. In the example of FIGS. 10A and 10B, the market 10 operates with the option of allowing reserve size. Reserve size 19b is liquidity that is not displayed to the marketplace but that is immediately accessible through e.g., the quote/order collector facility 20, as described above. It is illustrated here for explanatory reasons, in this embodiment it is not displayed to the market. In other embodiments, reserve size or interest could be shown, or could be reflected in aggregate interest.

In the example of FIGS. 10A and 10B, participants MLCO, FBCO, and GSCO on the bid side and participants MADF, RSSF, and SBSH, are crossing the market on the offer side (FIG. 10A). The process 200 matches t2 with t10 for 4500 shares @$20.02; t3 with t10 for 1500 shares @$20.02; t3 with t12 for 500 shares @$20.03; t11 with t12 for 2500 shares @$20.03; and t11 with t1 for 1000 shares @$20.04. These matches clear the lock/cross condition leaving ECN1 # at a bid of $20.01 for a size of 1,000 and a reserve of 0, and participant SBSH at a offer of $20.04 for a size of 500 displayable and a reserve of 4,000 that is not displayed (FIG. 10B). Alternatively, SBSH's offer can be auto-refreshed and display a size of 1000 at $20.04 have low a reserve of 3500.

The market 10 would generate the following execution report.

| Execution Reports: | | | |
|---|---|---|---|
| Buyer | Seller | Quantity | Price |
| MLCO | MADF | 4500 | $20.02 |
| FBCO | MADF | 1500 | $20.02 |
| FBCO | RSSF | 500 | $20.03 |
| GSCO | RSSF | 2500 | $20.03 |
| GSCO | SBSH | 1000 | $20.04 |

Other Embodiments

Other embodiments are within the scope of the claims. For example the process can be used with other products that have a value that can change over short periods of time in accordance with fluctuations in market conditions.

What is claimed is:

1. A computer implemented method of determining an opening price for a product traded in a trading system, the method executed over a distributed computer system network, said method comprising:
   detecting a lock/cross condition in the market prior to opening;
   removing the lock/cross condition to allow opening of trading in the particular product, with removing further comprising computer executed actions of:
      identifying the oldest of interest at the most aggressive price on each side of the market;
      selecting the older interest of the identified interest to designate as initial interest;
      matching initial interest against all contra side interest; and
      disseminating electronically over the distributed computer system network opening bid and offer prices as the prices of the interest that remain at the top of the bid and offer sides traded in the trading system.

2. The method of claim 1 wherein the products are financial instruments.

3. The method of claim 2 further comprising:
   calling an internalizing agent process to match orders against contra side interest of a market participant at the best price and having an ID matched to an ID in the order.

4. The method of claim 1 wherein interest is all quote-generated and non-directed, priced orders an the initial interest is designated as an incoming order.

5. The method of claim 1 further comprising:
executing any remaining interest in a particular priority.

6. The method of claim 5 wherein the particular priority is Price/Time priority.

7. The method of claim 1 wherein interest exists at multiple price levels on each side of the market and at each price level, and all displayed interest is executed first, before moving to another price level.

8. The method of claim 1 wherein interest exists at multiple price levels on each side of the market and at each price level, and all displayed interest is executed first, followed by any reserve size before moving to another price level.

9. The method of claim 8 wherein reserve size is executed in the order in which displayed size was executed.

10. The method of claim 1 wherein the sides of the market are a bid side and an offer side.

11. The method of claim 1 wherein executions occur at the price of book interest so that any price improvement is realized by the initial interest.

12. The method of claim 1 wherein after an execution occurs, the method further comprises:
updating quote-generated orders.

13. The method of claim 1 further comprises:
testing whether the lock/cross condition has been removed; and if the condition was removed,
disseminating an opening price for the product.

14. A computer program product for removing a lock/cross condition to allow opening of trading in a security said computer program product residing on a computer readable medium comprising instructions for causing a computer to:
identify the oldest of interest at the most aggressive price on each side of the market;
select the older interest of the identified interest to designate as initial interest;
match initial interest against all contra side interest;
remove the lock/cross condition to allow opening of trading in the security; and
disseminate electronically over a distributed computer system network, opening bid and offer prices as the prices of quotes that remain at the top of the bid and offer sides of the market.

15. The computer program product of claim 14 wherein instructions that cause the computer to further comprise instructions that cause the computer to:
call an internalizing agent process to match orders against contra side interest of a market participant at the best price and having an ID matched to an ID in the order.

16. The computer program product of claim 14 wherein the instructions cause the computer to execute matches at the price of book interest so that any price improvement accrues to the initial interest.

17. The computer program product of claim 14 wherein interest exists at multiple price levels on each side of the market and at each price level, and all displayed interest is executed first before moving to another price level.

18. The computer program product of claim 14 further comprising instructions that cause the computer to:
update-quote-generated orders.

19. The computer program product of claim 14 further comprises instructions to:
test whether the lock/cross condition has been removed; and if the condition was removed,
disseminate an opening price for the product.

20. The computer program product of claim 14 further comprising instructions that cause the computer to:
execute any remaining interest in a particular priority.

21. The computer program product of claim 14 further comprising instructions that cause the computer to:
execute orders at the price of book interest so that any price improvement is realized by the initial interest.

22. A system for determining an opening price for products traded over a distributed, networked computer system, said system comprising:
a plurality of workstations for entering orders for a financial product into the distributed, networked computer system; and
a server computer coupled to the workstations for the orders, said server computer executing a server process that removes a lock/cross condition to allow opening of trading in the financial product and determines an opening price for the financial product, the server process comprising instructions that cause the server to:
identify the oldest of interest at the most aggressive price on each side of the market;
select the older interest of the identified interest to designate as initial interest; and
match initial interest against all contra side interest;
disseminate opening bid and offer prices as the prices of quotes that remain at the top of the bid and offer sides of the market.

23. The system of claim 22 wherein the computer program product further comprises instructions for causing the server to:
call an internalizing agent process to match orders against contra side interest of a market participant at the best price and having an ID matched to an ID in the order.

24. The system of claim 22 wherein the computer program product further comprises instructions that cause the computer to:
test whether the lock/cross condition has been removed; and if the condition was removed,
disseminate an opening price for the financial product.

25. The system of claim 22 wherein the financial products is stock.

* * * * *